United States Patent
Han et al.

(10) Patent No.: US 12,065,147 B2
(45) Date of Patent: Aug. 20, 2024

(54) METHOD OF SIMULTANEOUSLY ESTIMATING MOVEMENT AND SHAPE OF TARGET VEHICLE USING PRELIMINARY DISTRIBUTION MODEL OF TRACKLET

(71) Applicants: Hyundai Motor Company, Seoul (KR); Kia Corporation, Seoul (KR); Handong Global University Industry-Academic Cooperation Foundation, Pohang-si (KR)

(72) Inventors: Seul Ki Han, Seoul (KR); Dahye Ham, Gyeongsangbuk-do (KR); Boyoung Jung, Gyeongsangbuk-do (KR); Won-Sang Ra, Gyeongsangbuk-do (KR); Ui-Suk Suh, Gyeongsangbuk-do (KR)

(73) Assignees: Hyundai Motor Company, Seoul (KR); Kia Corporation, Seoul (KR); Handong Global University Industry-Academic Cooperation Foundation, Gyeongsangbuk-do (KR)

( * ) Notice: Subject to any disclaimer, the term of this patent is extended or adjusted under 35 U.S.C. 154(b) by 533 days.

(21) Appl. No.: 17/495,208

(22) Filed: Oct. 6, 2021

(65) Prior Publication Data
US 2022/0105946 A1 Apr. 7, 2022

(30) Foreign Application Priority Data
Oct. 6, 2020 (KR) .................. 10-2020-0128990

(51) Int. Cl.
*B60W 40/04* (2006.01)
*B60W 50/00* (2006.01)
(Continued)

(52) U.S. Cl.
CPC ........ *B60W 40/04* (2013.01); *B60W 50/0097* (2013.01); *G01C 21/1652* (2020.08);
(Continued)

(58) Field of Classification Search
CPC ............. B60W 40/04; B60W 50/0097; B60W 2254/4041; B60W 2050/0028;
(Continued)

(56) References Cited

U.S. PATENT DOCUMENTS 9,292,792 B1 * 3/2016 Pedersen ........... G06F 18/24155
9,600,765 B1 * 3/2017 Pedersen ................. F41H 11/00
(Continued)

*Primary Examiner* — Peter M Bythrow
(74) *Attorney, Agent, or Firm* — Fox Rothschild LLP

(57) ABSTRACT

A method of simultaneously estimating a movement and shape of a target vehicle using a preliminary distribution model of a tracklet may have high reliability in estimation performance even with a change in heading of the target vehicle while being implemented in real time by setting the preliminary distribution model defined by a small number of representative tracklet appearance points using a tracklet defined in an orthogonal coordinate system and a linear correspondence relationship between a preliminary distribution model of the tracklet and a central position of the target vehicle and performing many-to-one data association between tracklet outputs. The method of simultaneously estimating the movement and shape of the target vehicle using the preliminary distribution model of the tracklet is performed by a signal processing device configured to process signals emitted from a plurality of radars mounted at a host vehicle and reflected from the target vehicle.

20 Claims, 5 Drawing Sheets

(51) Int. Cl.
*G01C 21/16* (2006.01)
*G01S 13/931* (2020.01)

(52) U.S. Cl.
CPC .... *G01S 13/931* (2013.01); *B60W 2050/0028* (2013.01); *B60W 2554/4041* (2020.02); *B60W 2554/4042* (2020.02); *B60W 2554/4043* (2020.02); *B60W 2554/4044* (2020.02); *B60W 2554/801* (2020.02); *B60W 2554/802* (2020.02)

(58) Field of Classification Search
CPC . B60W 2254/4042; B60W 2254/4044; B60W 2254/802; B60W 2254/4043; B60W 2254/801; G01C 21/1652; G01S 13/931
See application file for complete search history.

(56) References Cited

U.S. PATENT DOCUMENTS

| | | | |
|---|---|---|---|
| 11,170,215 B1* | 11/2021 | Sieracki | G06V 10/44 |
| 11,453,422 B2* | 9/2022 | Nishino | B60M 1/28 |
| 2011/0222732 A1* | 9/2011 | Higuchi | G08G 1/167 |
| | | | 382/104 |
| 2016/0358477 A1* | 12/2016 | Ansari | B60W 60/0059 |
| 2017/0010618 A1* | 1/2017 | Shashua | G06V 20/56 |
| 2021/0018609 A1* | 1/2021 | Zhu | G01S 13/48 |
| 2021/0026355 A1* | 1/2021 | Chen | G06F 18/22 |
| 2022/0126864 A1* | 4/2022 | Moustafa | G06T 1/0007 |
| 2023/0005374 A1* | 1/2023 | Elimaleh | G08G 1/065 |

\* cited by examiner

FIG. 4

| TRACKLET APPEARANCE POSITION | COORDINATES FOR CENTRAL POINT OF TARGET VEHICLE (FUNCTION h) | TRACKLET APPEARANCE POSITION | COORDINATES FOR CENTRAL POINT OF TARGET VEHICLE (FUNCTION h) |
|---|---|---|---|
| $\bar{p}_1$ | $\left(\dfrac{\bar{L}}{2}\cos\bar{\gamma},\ \dfrac{\bar{L}}{2}\sin\bar{\gamma}\right)$ | $\bar{p}_5$ | $-\bar{p}_1$ |
| $\bar{p}_2$ | $(\bar{p}_1 + \bar{p}_3)$ | $\bar{p}_6$ | $-(\bar{p}_1 + \bar{p}_3)$ |
| $\bar{p}_3$ | $\left(-\dfrac{\bar{W}}{2}\sin\bar{\gamma},\ -\dfrac{\bar{W}}{2}\cos\bar{\gamma}\right)$ | $\bar{p}_7$ | $-\bar{p}_3$ |
| $\bar{p}_4$ | $\bar{p}_3 - \bar{p}_1$ | $\bar{p}_8$ | $\bar{p}_1 - \bar{p}_3$ |

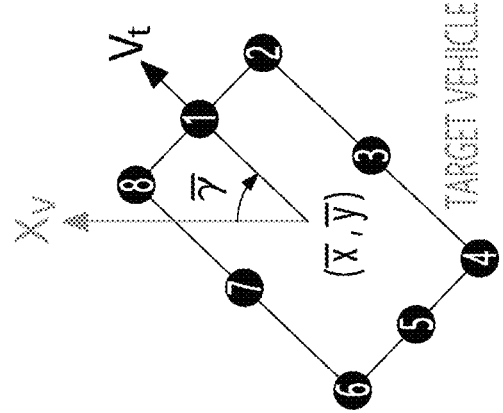

METHOD OF SIMULTANEOUSLY ESTIMATING MOVEMENT AND SHAPE OF TARGET VEHICLE USING PRELIMINARY DISTRIBUTION MODEL OF TRACKLET

CROSS-REFERENCE TO RELATED APPLICATION

This application claims under 35 U.S.C. § 119(a) the benefit of Korean Patent Application No. 10-2020-0128990, filed on Oct. 6, 2020, the entire contents of which are incorporated by reference herein.

BACKGROUND

(a) Technical Field

The present disclosure relates to a method of simultaneously estimating a movement and a shape of a target vehicle, more particularly, to the method of simultaneously estimating the movement and the shape of a target vehicle, e.g., using a preliminary distribution model of radar tracklet outputs having high reliability in estimation performance even with a change in heading of the target vehicle.

(b) Description of the Related Art

With the ongoing development of autonomous vehicles, information about not only an environment around a vehicle that is self-driving (hereinafter referred to as a host vehicle) and an absolute/relative position of the host vehicle but also an advancing direction or shape of another vehicle that is moving ahead of the host vehicle or beside the host vehicle (hereinafter referred to as a target vehicle) is essentially required. If the host vehicle cannot predict the shape or advancing direction of the target vehicle that is driving therearound while driving on a road, it may be difficult to prevent an accident with the target vehicle that is driving in the vicinity of the host vehicle.

In order to solve this problem, a plurality of radars is installed at the host vehicle and information collected from the radars is processed to recognize the position of the host vehicle, to sense a peripheral object, including the target vehicle around the host vehicle, a person, and an animal, or to recognize a free space.

An extended measurement value of high-resolution radar having high distance resolution includes not only movement information of the target vehicle but also important information for estimating the shape of the target vehicle including the size and width of the target vehicle. Here, the extended measurement value refers to a set of polar coordinate system measurement values of the target vehicle detected by the high-resolution radar, and the polar coordinate system measurement values include relative distance, Doppler velocity, and azimuth. However, measurement values including several irregular noises are acquired for a single target vehicle, and the number of measurement values is frequently changed.

In a conventional method used to track movement information or the shape of the target vehicle, a process of matching the extended measurement value with a target vehicle shape model (extent model) is essentially performed. In order to consider the number and distribution of extended measurement values irregularly changed depending on the incidence angle of the radar, particle filter, probability hypothesis density (PHD) filter, and random finite set (RGS) techniques are conventionally used.

Under conventional techniques, real-time implementation is not easy due to enormous calculations that are required, and when the extended measurement value is matched with the target vehicle shape model in the direction of a heading of the target vehicle, i.e., in the direction that the front of the target vehicle faces, ambiguity may be caused, whereby it is difficult to achieve stable target tracking performance.

In particular, since gating is performed with respect to an entirety of the target vehicle shape model in order to inhibit clutter, complexity of a data association algorithm that determines whether the extended measurement value has resulted from the target vehicle increases, which is caused by a severe nonlinear correspondence relationship between the position of the target vehicle in an orthogonal coordinate system and the extended measurement value in the polar coordinate system.

Here, clutter, which is a radar signal reflected from an environment around the target vehicle, not the target vehicle, is not a true measurement value but a false measurement value, gating is a process of discriminating a probabilistically meaningful radar measurement value based on a predicted value, and data association is a process of determining whether a gated radar measurement value has resulted from the target vehicle.

FIG. 1 shows a conventional data association algorithm for directly corresponding to a polar coordinate system target vehicle shape model using an extended measurement value.

Referring to FIG. 1, three tracklets located in a polar coordinate system gate including a polar coordinate system target vehicle shape model are selected as associated extended measurement values, and then a data association algorithm is performed for the selected associated extended measurement values. That is, since the conventional target vehicle shape model is constituted by unmeasured numbers of extended measurement value appearance points (all points at which radar rays intersect the target vehicle shape model), the amount of calculation increases in geometrical progression during a many-to-many data association process between the extended measurement values and the target vehicle shape model, whereby it is impossible to implement the conventional target tracking algorithm based on the extended measurement values in real time.

Furthermore, the nonlinear correspondence relationship between the extended measurement values and the position of the target vehicle causes ambiguity when a measurement equation is constructed, whereby estimation performance may be greatly changed depending on a change in target heading.

SUMMARY

Accordingly, the present disclosure is directed to a method of simultaneously estimating the movement and shape of a target vehicle using a preliminary distribution model of a tracklet that substantially obviates one or more problems due to limitations and disadvantages of the related art.

An object of the present disclosure is to provide a method of simultaneously estimating the movement and shape of a target vehicle using a preliminary distribution model of radar tracklet outputs having high reliability in estimation performance even with a change in heading of the target vehicle while being implemented in real time.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a method of simultaneously estimating the movement and shape of a target vehicle (e.g., using a preliminary distribution model of a tracklet), which is performed by a signal processing device configured to process signals emitted from a plurality of radars mounted at a host vehicle and reflected from the target vehicle, includes defining an appearance point of at least one tracklet corresponding to a specific point of a target vehicle shape approximating a polygonal form in an orthogonal coordinate system and setting a coordinate function for a central point of the target vehicle with respect to each defined point to set a preliminary distribution model, acquiring tracklet outputs from the plurality of radars, if the at least one tracklet is located in a gate set based on the at least one tracklet appearance point, among the acquired tracklet outputs, selecting the at least one tracklet appearance point located in the gate as an associated tracklet, creating a measurement equation based on the associated tracklet, the position of each of the at least one tracklet appearance point, and the coordinate function, calculating an estimated value of a state variable of the target vehicle based on the state variable and the measurement equation to update the state variable, and creating a predicted value of the target vehicle at the next point in time based on the calculated estimated value of the state variable and a target vehicle movement equation in a host vehicle coordinate system.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 shows preliminary distribution characteristics of a tracklet schematizing representative tracklet appearance positions in a target vehicle shape defined by a rectangle.

DETAILED DESCRIPTION OF THE DISCLOSURE

Figure 1:
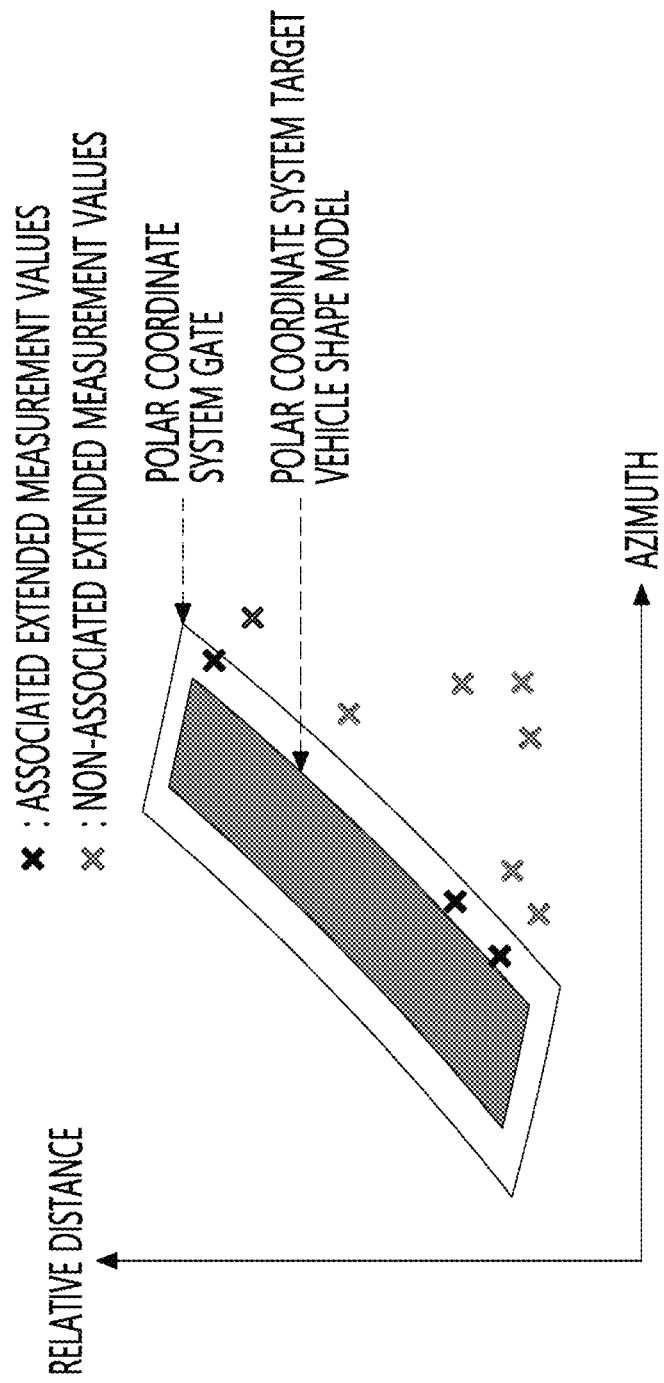
FIG. 1 shows a conventional data association algorithm for directly corresponding to a polar coordinate system target vehicle shape model using an extended measurement value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to sufficiently understand the present disclosure, advantages in operation of the present disclosure, and objects achieved by implementation of the present disclosure, the accompanying drawings describing exemplary embodiments of the present disclosure and the contents stated in the accompanying drawings must be referred to.

Hereinafter, preferred embodiments of the present disclosure will be described in detail with reference to the accompanying drawings. The same reference numerals in the respective drawings denote the same members.

A process of tracking an object in an image is a process of detecting the object in each frame constituting the image, connecting a movement route of the object between short image frames to detect a tracklet, which is information indicating a short movement route of an object, and connecting tracklets detected from all frames of the image to each other to create a tracking trajectory of the object.

A tracklet as used in the present disclosure, which is an intermediate output of a radar signal processing logic circuit, refers to orthogonal coordinate system movement information of a target vehicle provisionally calculated as an extended measurement value. Although the number of tracklets may vary for one target vehicle, irregularity is not prominent, compared to the extended measurement value.

In the tracklet used in the present disclosure, the fact that there is a high possibility of the tracklet appearing in the vicinity of a specific point of a target vehicle shape model is considered, unlike a general extended measurement value having high irregularity. Representative positions at which tracklets appear on average are set to a preliminary distribution model.

An inertial coordinate system and a host vehicle coordinate system, which will be used in the following description, will be described first.

Figure 2:
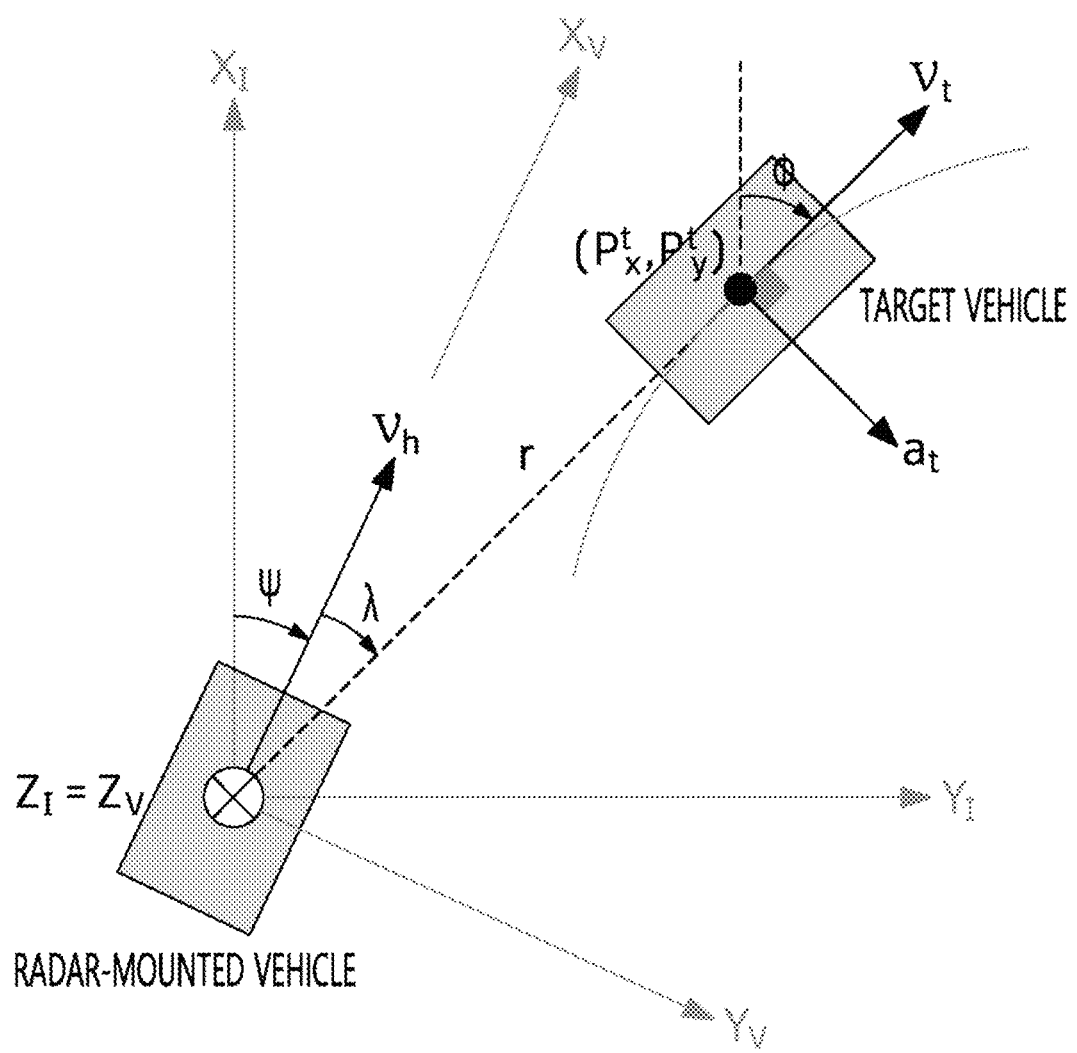
FIG. 2 shows a coordinate system that represents a geometrical relationship between a vehicle equipped with high-resolution radar (host vehicle) and a target vehicle.

FIG. 2 shows a coordinate system that represents a geometrical relationship between a vehicle equipped with high-resolution radar (host vehicle) and a target vehicle.

In FIG. 2, I indicates an inertial coordinate system. The inertial coordinate system is a reference system in which uniform movement of an object having no force applied thereto is maintained. V indicates a host vehicle coordinate system having the origin ⊗ as the center of the host vehicle and the axis $X_V$ as an advancing direction of the host vehicle. $(p_x^t, p_y^t)$ indicates the position of the target vehicle, $v_h$ indicates the velocity of the host vehicle, $v_t$ indicates the velocity of the target vehicle, $\psi$ indicates heading of the host vehicle, $\phi$ indicates heading of the target vehicle, and $a_t$ indicates indicates centripetal force of the target vehicle. X, Y, or Z indicates one of three-dimensional axes. In particular, it can be seen that the Z axis in the inertial coordinate system and the Z axis in the host vehicle coordinate system are the same.

In particular, FIG. 2 shows relative movement between the vehicle equipped with high-resolution radar (host vehicle) and the target vehicle.

A relative movement equation of the target vehicle is defined.

The relative movement of the target vehicle defined in the inertial coordinate system is described as a constant turn rate (CT) movement model. In the case in which the relative movement of the target vehicle is discretized for sampling time T and then movement of the target vehicle is described in the host vehicle coordinate system, this may be represented by Mathematical Expression 1.

[Mathematical Expression 1]

$$X_{k+1}^V = \begin{bmatrix} \cos\Delta\psi_k \cdot I^{3\times3} & \sin\Delta\psi_k \cdot I^{3\times3} \\ -\sin\Delta\psi_k \cdot I^{3\times3} & \cos\Delta\psi_k \cdot I^{3\times3} \end{bmatrix} \left( \begin{bmatrix} F & 0 \\ 0 & F \end{bmatrix} X_k^V - \Delta X_k^V \right) + u_k$$

In Mathematical Expression 1, $u_k$ indicates process noise for reflecting uncertainty in movement of the target vehicle, and may be assumed as a normal distribution having an average of 0 (zero) and a dispersion of Q. Vectors and matrices in Mathematical Expression 1 are defined as represented by Mathematical Expression 2 and Mathematical Expression 3.

[Mathematical Expression 2]

$$X_k^V = [\, p_x^t - p_x^h \quad v_x^t \quad a_x^t \quad p_y^t - p_y^h \quad v_y^t \quad a_y^t \,]^T,$$

$$\Delta X_k^V = [\, Tv_h^x \quad 0 \quad 0 \quad Tv_h^y + T^2 v_h \psi/2 \quad 0 \quad 0 \,]^T$$

[Mathematical Expression 3]

$$F \approx \begin{bmatrix} 1 & T & T^2/2 \\ 0 & 1 & T \\ 0 & 0 & 1 \end{bmatrix},$$

$$Q \approx \begin{bmatrix} 0 & T^4/8 & 0 \\ T^4/8 & 0 & T^2/2 \\ 0 & T^2/2 & T \end{bmatrix}$$

In Mathematical Expression 2, heading $\psi$ of the host vehicle may approximate $\psi_{k+1} \approx \psi_k + \omega_{h,k} T$ at every timing using yaw rate (or rotational angular velocity) of the host vehicle.

The relationship between heading $\phi_k$ of the target vehicle in the inertial coordinate system and heading $\gamma_k$ of the target vehicle in the host vehicle coordinate system may be represented by Mathematical Expression 4.

[Mathematical Expression 4]

$$\gamma_k \triangleq \phi_k - \psi_k$$

Next, a system model of a simultaneous target vehicle movement/shape estimation filter will be described.

A state variable x of the target vehicle ultimately estimated through the method proposed by the present disclosure may be represented by Mathematical Expression 5 having the central position (x, y) of the target vehicle, the velocity $v_t$ of the target vehicle, the heading Y of the target vehicle, the rotational angular velocity $\omega_t$ of the target vehicle, the length l of the target vehicle, and the width W of the target vehicle as variables.

[Mathematical Expression 5]

$$x = [x \; y \; v_t \; \gamma \; \omega_t \; l \; w]^T$$

The target movement model of Mathematical Expression 1 may be expressed as a host vehicle coordinate system target movement equation expressed as a difference equation of the state vector in Mathematical Expression 5, as represented by Mathematical Expression 6 below, using the relative position of the target vehicle and the heading angle of the target vehicle defined in the host vehicle coordinate system.

[Mathematical Expression 6]

$$x_{k+1} = f(x_k, u_k^c) + u_k$$

Variables constituting Mathematical Expression 6 are shown in Mathematical Expression 7.

[Mathematical Expression 7]

$$f(\cdot) = [\, R_{ht,k}^V \quad v_{t,k} \quad \gamma_k + T\omega_{t,k} - T\omega_{h,k} \quad \omega_{t,k} \quad l_k \quad w_k \,]^T$$

$$R_{ht,k+1}^V = R_z(\Delta\psi)(R_{ht,k}^V - \Delta R_{h,k}^V) + \frac{2v_{t,k}}{\omega_{t,k}} \sin\left(\frac{T}{2}\omega_{t,k}\right) \begin{bmatrix} \cos\left(\gamma_k - \omega_{h,k}T + \frac{T}{2}\omega_{t,k}\right) \\ \sin\left(\gamma_k - \omega_{h,k}T + \frac{T}{2}\omega_{t,k}\right) \end{bmatrix}$$

$$R_{h,k}^V = \begin{bmatrix} x \\ y \end{bmatrix}, \; R_z(\Delta\psi) = \begin{bmatrix} \cos(\Delta\psi) & \sin(\Delta\psi) \\ -\sin(\Delta\psi) & \cos(\Delta\psi) \end{bmatrix}$$

In Mathematical Expression 6, $\Delta\psi$ indicates the angular increment of the yaw of the host vehicle, and $R_{ht,k+1}^V$ indicates the relative position of the target vehicle to the host vehicle.

Figure 3:
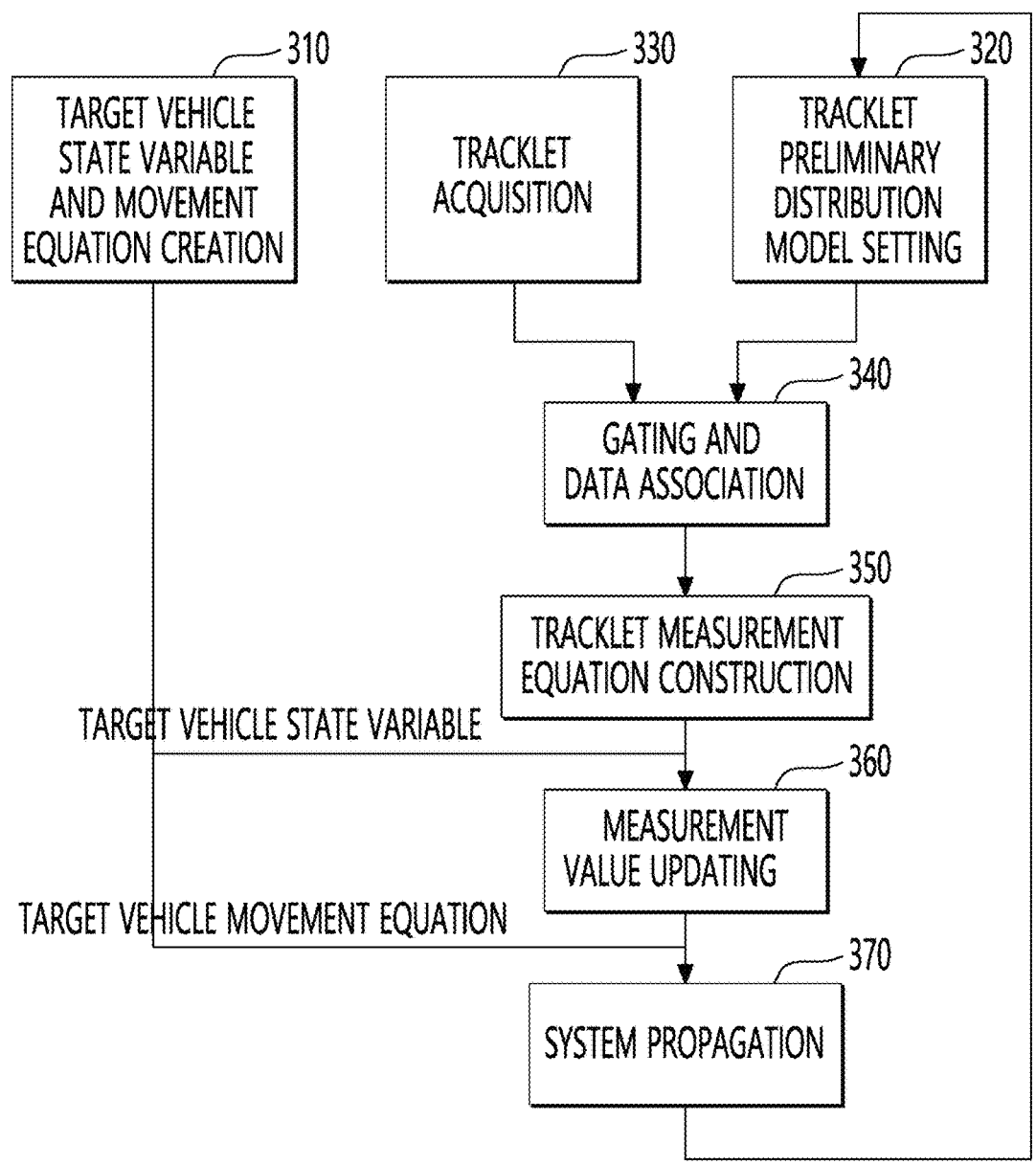
FIG. 3 shows an embodiment of a method of simultaneously estimating the movement and shape of a target vehicle using a preliminary distribution model of a tracklet according to the present disclosure.

FIG. 3 shows an embodiment of a method of simultaneously estimating the movement and shape of a target vehicle using a preliminary distribution model of a tracklet according to the present disclosure.

Referring to FIG. 3, the method of simultaneously estimating the movement and shape of the target vehicle using the preliminary distribution model of the tracklet according to the present disclosure (hereinafter referred to as the method of simultaneously estimating the movement and shape of the target vehicle) includes a target vehicle state variable and movement equation creation step (310), a tracklet preliminary distribution model setting step (320), a tracklet acquisition step (330), a gating and data association step (340), a tracklet measurement equation construction step (350), a measurement value updating step (360), and a system propagation step (370).

In the target vehicle state variable and movement equation creation step (310), a movement model of the target vehicle (Mathematical Expression 1) and a state variable of the target vehicle (Mathematical Expression 5) in the inertial coordinate system are set, and the relative position of the target vehicle and the heading angle of the target vehicle in the host vehicle coordinate system are applied to the movement model of the target vehicle (Mathematical Expression 1) to create the target vehicle movement equation (Mathematical Expression 6) in the host vehicle coordinate system.

In the tracklet preliminary distribution model setting step (320), a preliminary distribution model of the tracklet is set. Although the appearance position of the tracklet with respect to the target vehicle is somewhat irregular, it is characterized in that the appearance position of the tracklet is distributed at a specific point on the contour of the target vehicle shape on average.

FIG. 4 shows preliminary distribution characteristics of a tracklet schematizing representative tracklet appearance positions in a target vehicle shape defined by a rectangle.

Referring to the left side of FIG. 4, it can be seen that the preliminary distribution model of the tracklet includes specific points ① to ⑧ of the target vehicle shape approximating a rectangular form in the orthogonal coordinate system. Referring to the right side of FIG. 4, it can be seen that each of the eight points may be described as a function of the central position $(\bar{x}, \bar{y})$ in the host vehicle coordinate system, the length $\bar{l}$, the width $\bar{w}$, and the heading $\bar{\gamma}$ of the target vehicle, which are predicted, i.e. a coordinate function h for the central point of the target vehicle, as shown in FIG. 2. The high-resolution radar may not sense some points of the preliminary distribution model occluded by a body of the target vehicle depending on the incidence angle of the high-resolution radar. As a result, the number of tracklet outputs provided by the radar may vary.

Referring to the right side of FIG. 4, it can be seen that the coordinate $\bar{p}_2$ of the second point is the sum $(\bar{p}_1+\bar{p}_3)$ of the coordinate of the second point and the coordinate of the third point. The coordinates of the fourth, fifth, seventh, and ninth points are calculated using similar methods.

In the tracklet acquisition step (330), a tracklet is acquired. The tracklet output used in the present disclosure is the sum of the coordinate function h for the central point of the target vehicle and unknown measurement noise.

In the gating and data association step (340), a gating and data association process is performed with respect to the tracklet acquired in the tracklet acquisition step (330) and the coordinate function h for the central point of the target vehicle set in the tracklet preliminary distribution model setting step (320) in order to determine the point of the target vehicle from which the tracklet acquired in the tracklet acquisition step (330) has resulted and to select an associated tracklet.

Figure 5:
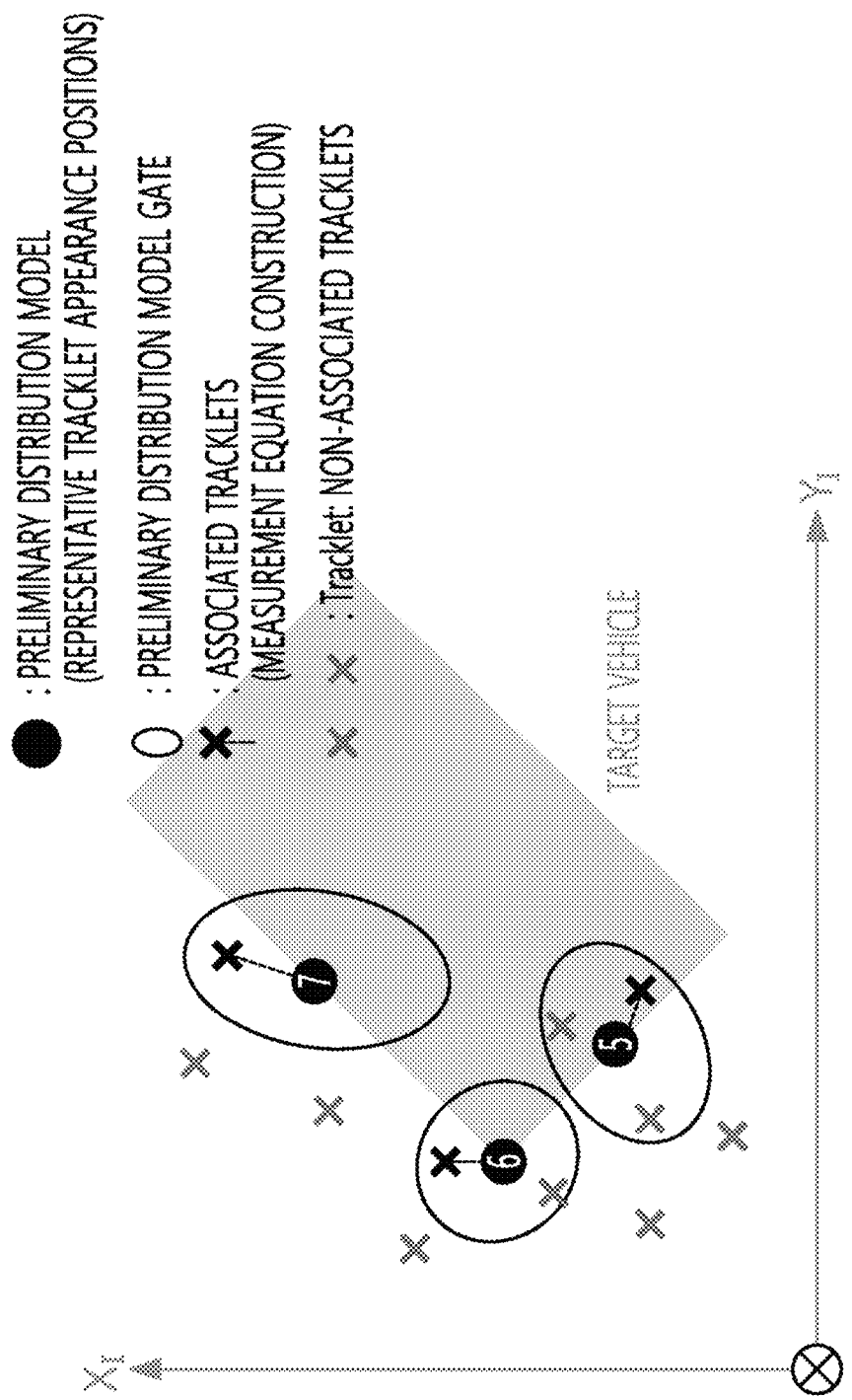
FIG. 5 illustrates gating and data association of the preliminary distribution model of the tracklet.

FIG. 5 illustrates gating and data association of the preliminary distribution model of the tracklet.

FIG. 5 schematizes a concept of processing actually acquired tracklet outputs of the high-resolution radar in consideration of a correspondence relationship between coordinate functions h for the central point of the target vehicle defined in FIG. 4.

Referring to FIG. 5, the gate is set for three points ⑤, ⑥, and ⑦, among the points $\bar{P}_j$ j=1, 2, ..., 8 of the preliminary distribution model. The tracklet in the gate is considered as an effective tracklet output that has resulted from a corresponding point, and the tracklet output outside the gate is considered as one that has resulted from another point of the preliminary distribution model or clutter.

It can be seen that, although only one tracklet is present in the gate of point ⑦, three tracklets are present at point ⑤ and two tracklets are present at point ⑥.

In the case in which one tracklet is present in the gate, the tracklet is selected as a tracklet that has resulted from a corresponding point (hereinafter referred to as an associated tracklet). In the case in which a plurality of tracklets is present in the gate, however, it is necessary to further determine which of the tracklets is an associated tracklet. For example, the tracklet located closest to the representative tracklet appearance position of the preliminary distribution model may be selected as a tracklet that has resulted from a corresponding point, i.e. an associated tracklet.

In the tracklet measurement equation construction step (350), a tracklet measurement equation for estimating the movement and shape of the target vehicle is constructed using the associated tracklet selected in the gating and data association step (340).

A tracklet measurement equation $z_k$ represented by Mathematical Expression 8 below may be constructed using the associated tracklet and a correspondence relationship between a predicted value $\bar{P}_j$ of each point of the preliminary distribution model and a predicted value of the shape $(\bar{l}, \bar{w})$ of the target vehicle in the orthogonal coordinate system (the function h shown in FIG. 4).

$$z_k = h(x_k) + v_k \quad \text{[Mathematical Expression 8]}$$

In Mathematical Expression 8, $v_k$ indicates measurement noise included in the tracklet output of the high-resolution radar. The measurement noise is considered as following a normal distribution having an average of 0 and a dispersion of $R_k$.

In the measurement value updating step (360), a Kalman filter measurement updating process is performed with respect to the result of the tracklet measurement equation constructed in the tracklet measurement equation construction step (350) and the state variable of the target vehicle represented by Mathematical Expression 5, whereby estimated values of the central position in the orthogonal coordinate system and the shape (length and width) of the target vehicle are updated.

The Kalman filter measurement updating process is performed using the state variable of the target vehicle represented by Mathematical Expression 5 and the tracklet measurement equation represented by Mathematical Expression 8, as represented by Mathematical Expression 9 below, to calculate estimated values of the state variable of the target vehicle, i.e. the central position (x, y) of the target vehicle, the velocity $v_t$ of the target vehicle, the heading $\gamma$ of the target vehicle, and the shape of the target vehicle, i.e. the length l and the width W of the target vehicle.

[Mathematical Expression 9]

$$\hat{x}_{k|k} = \hat{x}_{k|k-1} + P_{k|k} H_k^T R_k^{-1}(z_k - h(\hat{x}_{k|k-1}))$$

$$P_{k|k}^{-1} = P_{k|k-1}^{-1} + H_k^T R_k^{-1} H_k, \; H_k = \frac{\partial h}{\partial x}\bigg|_{x=\hat{x}_{k|k-1}}$$

In the system propagation step (370), a Kalman filter system propagation process is performed with respect to the movement and shape of the target vehicle updated in the measurement value updating step (360) to create predicted values of the central position and shape of the target vehicle at the next point in time.

The Kalman filter system propagation process is performed using the measurement equation (Mathematical Expression 8) and the target movement equation in the host vehicle coordination system (Mathematical Expression 6), whereby the position and shape of the target vehicle at the next point in time may be predicted as represented by Mathematical Expression 10.

[Mathematial Expression 10]

$$\hat{x}_{k+1|k} = f(x_k, u_k^c) + u_k$$

$$P_{k+1|k} = F_k P_{k|k} F_k^T + Q, \; F_k = \frac{\partial f}{\partial x}\bigg|_{x=\hat{x}_{k|k}}$$

The predicted central position (x, y) and shape ($\bar{l}$, $\bar{w}$) of the target vehicle are reflected in the target vehicle state variable and movement equation creation step (310) to reconstruct the preliminary distribution model of the tracklet, and the data association and target vehicle movement/shape parameter estimation process is repeated based thereon.

The tracklet preliminary distribution model setting step (320) may be performed by a signal processing device (not shown) installed at the host vehicle to process signals emitted from a plurality of radars mounted at the host vehicle and reflected from the target vehicle. The other steps (310 and 330 to 360) may be performed by the signal processing device or any device having a signal processing and calculation function mounted at the host vehicle, such as a main calculation device (not shown).

In the case in which each step is performed by the signal processing device, the signal processing device may include a preliminary distribution model setting unit, a tracklet output acquisition unit, a tracklet selection unit, a measurement equation creation unit, a state variable management unit, a target vehicle tracking unit, and a movement equation creation unit.

The preliminary distribution model setting unit may define an appearance point of at least one tracklet corresponding to a specific point of a target vehicle shape approximating a polygonal form in the orthogonal coordinate system and may set a coordinate function for the central point of the target vehicle with respect to each defined point to set a preliminary distribution model.

The tracklet output acquisition unit may acquire tracklet outputs from a plurality of radars.

In the case in which there is a tracklet located in a gate set based on the at least one tracklet appearance point, among the acquired tracklet outputs, the tracklet selection unit may select the at least one tracklet appearance point located in the gate as an associated tracklet.

The measurement equation creation unit may create a measurement equation based on the associated tracklet, the position of each of the at least one tracklet appearance point, and the coordinate function.

The state variable management unit may calculate an estimated value of a state variable of the target vehicle based on the state variable of the target vehicle and the measurement equation to update the state variable, and the target vehicle tracking unit may create a predicted value of the target vehicle at the next point in time based on the calculated estimated value of the state variable and a target vehicle movement equation in the host vehicle coordinate system.

In addition, the movement equation creation unit may set a movement model of the target vehicle in the inertial coordinate system and the state variable and may apply the relative position of the target vehicle in the host vehicle coordinate system and the heading angle of the target vehicle to the movement model to create the target vehicle movement equation.

The present disclosure described above may be implemented as a computer-readable program stored in a non-transitory computer-readable recording medium. The computer-readable medium may be any type of recording device in which data is stored in a computer-readable manner. The computer-readable medium may include, for example, a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, in a method of simultaneously estimating the movement and shape of a target vehicle using a preliminary distribution model of a tracklet according to the present disclosure, a small number of representative tracklet appearance points are provided, and many-to-one data association between tracklet outputs and individual output points is performed, whereby the method is very suitable for real-time implementation of a target tracking algorithm.

In addition, the position of the target vehicle and the tracklet have a linear correspondence relationship in the orthogonal coordinate system, and therefore it is possible to fundamentally prevent a problem with ambiguity occurring when a measurement equation is constructed and to improve reliability in estimation performance even though heading of the target vehicle is changed.

It should be noted that the effects of the present disclosure are not limited to the effects mentioned above, and other unmentioned effects will be clearly understood by those skilled in the art from the above description.

While the technical idea of the present disclosure has been described with reference to the accompanying drawings, this illustratively describes preferred embodiments of the present disclosure, not restricts the present disclosure. In addition, a person having ordinary skill in the art to which the present disclosure pertains will appreciate that various modifications and alterations are possible without departing from the category of the technical idea of the present disclosure.

What is claimed is:

1. A method of simultaneously estimating a movement and shape of a target vehicle, the method being performed by a signal processing device configured to process signals emitted from a plurality of radars mounted at a host vehicle and reflected from the target vehicle, the method comprising:
- defining an appearance point of at least one tracklet corresponding to a specific point of a target vehicle shape approximating a polygonal form in an orthogonal coordinate system and setting a coordinate function for a central point of the target vehicle with respect to each defined point to set a preliminary distribution model;
- acquiring tracklet outputs from the plurality of radars;
- if the at least one tracklet is located in a gate set based on the at least one tracklet appearance point, among the acquired tracklet outputs, selecting the at least one tracklet appearance point located in the gate as an associated tracklet;
- creating a measurement equation based on the associated tracklet, a position of each of the at least one tracklet appearance point, and the coordinate function;
- calculating an estimated value of a state variable of the target vehicle based on the state variable and the measurement equation to update the state variable; and
- creating a predicted value of the target vehicle at a next point in time based on the calculated estimated value of the state variable and a target vehicle movement equation in a host vehicle coordinate system.

2. The method according to claim 1, further comprising setting a movement model of the target vehicle in an inertial coordinate system and the state variable and applying a relative position of the target vehicle in the host vehicle coordinate system and a heading angle of the target vehicle to the movement model to create the target vehicle movement equation.

3. The method according to claim 2, wherein the movement model is a constant turn rate (CT) movement model, and the CT movement model is discretized for sampling time and is then defined in the host vehicle coordinate system.

4. The method according to claim 1, wherein the state variable comprises at least one of a central position of the target vehicle, velocity of the target vehicle, heading of the target vehicle, rotational angular velocity of the target vehicle, or length and width of the target vehicle.

5. The method according to claim 1, wherein the estimated value of the state variable comprises at least one of a central position of the target vehicle, velocity of the target vehicle, heading of the target vehicle, rotational angular velocity of the target vehicle, or length and width of the target vehicle.

6. The method according to claim 1, wherein the polygonal form comprises a quadrangular form.

7. The method according to claim 6, wherein the specific point is located at each of four corners and four sides of the quadrangular form.

8. The method according to claim 1, wherein the coordinate function for the central point of the target vehicle comprises a function of a central position in the host vehicle coordinate system, length of the target vehicle, width of the target vehicle, and heading of the target vehicle, all of which are predicted.

9. The method according to claim 8, wherein the coordinate function for the central point of the target vehicle is additionally expressed using coordinates of another specific point of the target vehicle.

10. The method according to claim 1, wherein the predicted value of the target vehicle comprises a predicted central position, length, and width of the target vehicle.

11. The method according to claim 10, further comprising reconstructing the preliminary distribution model based on the predicted value of the target vehicle.

12. A non-transitory computer-readable recording medium containing program instructions executed by a processor, the computer-readable recording medium comprising:
- program instructions that define an appearance point of at least one tracklet corresponding to a specific point of a target vehicle shape approximating a polygonal form in an orthogonal coordinate system and setting a coordinate function for a central point of the target vehicle with respect to each defined point to set a preliminary distribution model;
- program instructions that acquire tracklet outputs from the plurality of radars;
- if the at least one tracklet is located in a gate set based on the at least one tracklet appearance point, among the acquired tracklet outputs, program instructions that select the at least one tracklet appearance point located in the gate as an associated tracklet;
- program instructions that create a measurement equation based on the associated tracklet, a position of each of the at least one tracklet appearance point, and the coordinate function;
- program instructions that calculate an estimated value of a state variable of the target vehicle based on the state variable and the measurement equation to update the state variable; and
- program instructions that create a predicted value of the target vehicle at a next point in time based on the calculated estimated value of the state variable and a target vehicle movement equation in a host vehicle coordinate system.

13. A vehicle comprising:
- a plurality of radars; and
- a signal processing device, wherein the signal processing device comprises:
- a preliminary distribution model setting unit configured to define an appearance point of at least one tracklet corresponding to a specific point of a target vehicle shape approximating a polygonal form in an orthogonal coordinate system and to set a coordinate function for a central point of the target vehicle with respect to each defined point in order to set a preliminary distribution model;
- a tracklet output acquisition unit configured to acquire tracklet outputs from the plurality of radars;
- a tracklet selection unit configured to, if the at least one tracklet is located in a gate set based on the at least one tracklet appearance point, among the acquired tracklet outputs, select the at least one tracklet appearance point located in the gate as an associated tracklet;
- a measurement equation creation unit configured to create a measurement equation based on the associated tracklet, a position of each of the at least one tracklet appearance point, and the coordinate function;
- a state variable management unit configured to calculate an estimated value of a state variable of the target vehicle based on the state variable and the measurement equation in order to update the state variable; and
- a target vehicle tracking unit configured to create a predicted value of the target vehicle at a next point in time based on the calculated estimated value of the state variable and a target vehicle movement equation in a host vehicle coordinate system.

14. The vehicle according to claim 13, further comprising a movement equation creation unit configured to set a movement model of the target vehicle in an inertial coordinate system and the state variable and to apply a relative position of the target vehicle in the host vehicle coordinate system and a heading angle of the target vehicle to the movement model in order to create the target vehicle movement equation.

15. The vehicle according to claim 14, wherein the movement model is a constant turn rate (CT) movement model, and the CT movement model is discretized for sampling time and is then defined in the host vehicle coordinate system.

16. The vehicle according to claim 13, wherein the state variable comprises at least one of a central position of the target vehicle, velocity of the target vehicle, heading of the target vehicle, rotational angular velocity of the target vehicle, or length and width of the target vehicle.

17. The vehicle according to claim 13, wherein the estimated value of the state variable comprises at least one of a central position of the target vehicle, velocity of the target vehicle, heading of the target vehicle, rotational angular velocity of the target vehicle, or length and width of the target vehicle.

18. The vehicle according to claim 13, wherein the polygonal form comprises a quadrangular form.

19. The vehicle according to claim 13, wherein the coordinate function for the central point of the target vehicle comprises a function of a central position in the host vehicle coordinate system, length of the target vehicle, width of the target vehicle, and heading of the target vehicle, all of which are predicted.

20. The vehicle according to claim 19, wherein the coordinate function for the central point of the target vehicle is additionally expressed using coordinates of another specific point of the target vehicle.

* * * * *